US011885325B2

(12) United States Patent
Hahn

(10) Patent No.: US 11,885,325 B2
(45) Date of Patent: Jan. 30, 2024

(54) VALVE ASSEMBLY FOR A RECIPROCATING COMPRESSOR

(71) Applicant: Haier US Appliance Solutions, Inc., Wilmington, DE (US)

(72) Inventor: Gregory William Hahn, Mt. Washington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 392 days.

(21) Appl. No.: 17/096,195

(22) Filed: Nov. 12, 2020

(65) Prior Publication Data

US 2022/0145877 A1    May 12, 2022

(51) Int. Cl.

| | | |
|---|---|---|
| *F04B 53/14* | (2006.01) | |
| *F16K 15/14* | (2006.01) | |
| *F04B 53/10* | (2006.01) | |
| *F04B 39/10* | (2006.01) | |
| *F16K 15/16* | (2006.01) | |

(52) U.S. Cl.
CPC ........ *F04B 53/143* (2013.01); *F04B 39/1073* (2013.01); *F04B 53/1037* (2013.01); *F16K 15/148* (2013.01); *F16K 15/16* (2013.01)

(58) Field of Classification Search
CPC .............. F04B 39/1073; F04B 39/0261; F04B 39/108; F04B 39/0276; F04B 39/023; F04B 53/143; F04B 53/1037; F16K 15/148; F16K 15/16
See application file for complete search history.

(56) References Cited

U.S. PATENT DOCUMENTS

| | | |
|---|---|---|
| 6,676,388 B2 | 1/2004 | Lee et al. |
| 6,695,596 B2 | 2/2004 | Oh et al. |
| 6,835,052 B2 | 12/2004 | Kim |
| 6,913,450 B2 | 7/2005 | Hong et al. |
| 6,981,851 B2 | 1/2006 | Lilie |
| 7,063,520 B2 | 6/2006 | Oh et al. |
| 7,306,438 B2 | 12/2007 | Kang et al. |
| 7,357,626 B2 | 4/2008 | Kang et al. |

(Continued)

FOREIGN PATENT DOCUMENTS

| | | |
|---|---|---|
| KR | 100360261 B1 | 11/2002 |
| KR | 100504855 B1 | 8/2005 |

(Continued)

*Primary Examiner* — Charles G Freay
*Assistant Examiner* — Lilya Pekarskaya
(74) *Attorney, Agent, or Firm* — Dority & Manning, P.A.

(57) ABSTRACT

A reciprocating compressor includes a piston slidably mounted within a compression chamber and defining a suction port. A valve selectively permits a flow of gas through the suction port and includes a sealing portion positioned over the suction port, an attachment portion mechanically coupled to a compression face of the piston, a support portion that extends away from the attachment portion along the radial direction such that the attachment portion is positioned between the sealing portion and the support portion, wherein the support portion defines a flattened end opposite the sealing portion along the radial direction such that the valve has a non-circular shape, and a connecting portion that mechanically couples the support portion to the sealing portion and permits the sealing portion to move between an open position and a closed position.

16 Claims, 9 Drawing Sheets

(56) References Cited

U.S. PATENT DOCUMENTS

| | | |
|---|---|---|
| 7,381,033 B2 | 6/2008 | Lee et al. |
| 7,478,996 B2 | 1/2009 | Kang et al. |
| 7,748,967 B2 | 7/2010 | Park et al. |
| 7,841,844 B2 | 11/2010 | Park et al. |
| 8,297,957 B2 | 10/2012 | Park et al. |
| 9,605,666 B2 * | 3/2017 | Seagar ................ H02K 33/16 |
| 10,288,054 B2 * | 5/2019 | Lim ..................... F04B 39/10 |
| 2004/0228746 A1 | 11/2004 | Noh et al. |
| 2005/0013717 A1 | 1/2005 | Lee |
| 2005/0129548 A1 | 6/2005 | Kim et al. |
| 2007/0110600 A1 | 5/2007 | Park et al. |
| 2013/0119287 A1 * | 5/2013 | Kosmehl ................ F16K 1/32 |
| | | 251/318 |
| 2015/0004025 A1 * | 1/2015 | Kang ................ F04B 39/0215 |
| | | 417/415 |
| 2017/0218931 A1 | 8/2017 | Kang et al. |
| 2018/0023727 A1 * | 1/2018 | Repaci .................. F16K 47/02 |
| | | 417/469 |
| 2018/0187666 A1 | 7/2018 | Ahn et al. |
| 2018/0195502 A1 | 7/2018 | Ahn et al. |
| 2018/0223822 A1 * | 8/2018 | Lee ......................... F04B 7/04 |
| 2019/0345924 A1 * | 11/2019 | Hahn .................. F04B 39/1073 |
| 2020/0217270 A1 * | 7/2020 | Subramanya ........... F04B 39/06 |

FOREIGN PATENT DOCUMENTS

| | | |
|---|---|---|
| KR | 100677291 B1 | 2/2007 |
| KR | 101189448 B1 | 10/2012 |
| WO | WO2004/106737 A1 | 12/2004 |
| WO | WO2006/049512 A2 | 5/2006 |
| WO | WO2011/105683 A2 | 9/2011 |
| WO | WO2018/143592 A1 | 8/2018 |

* cited by examiner

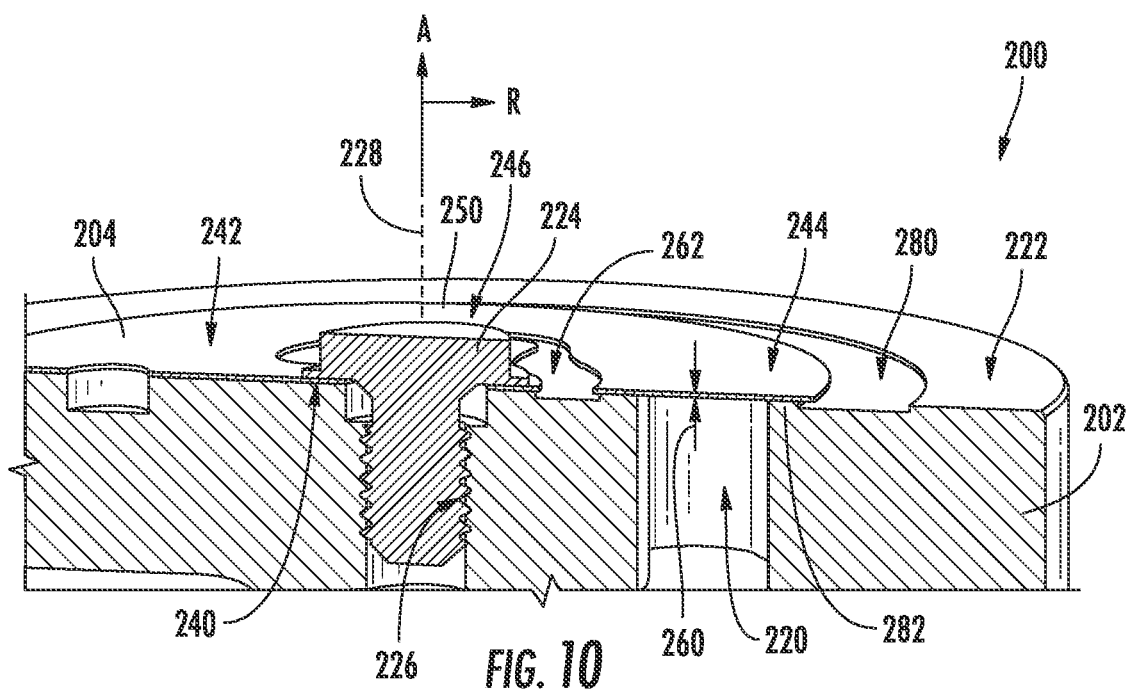
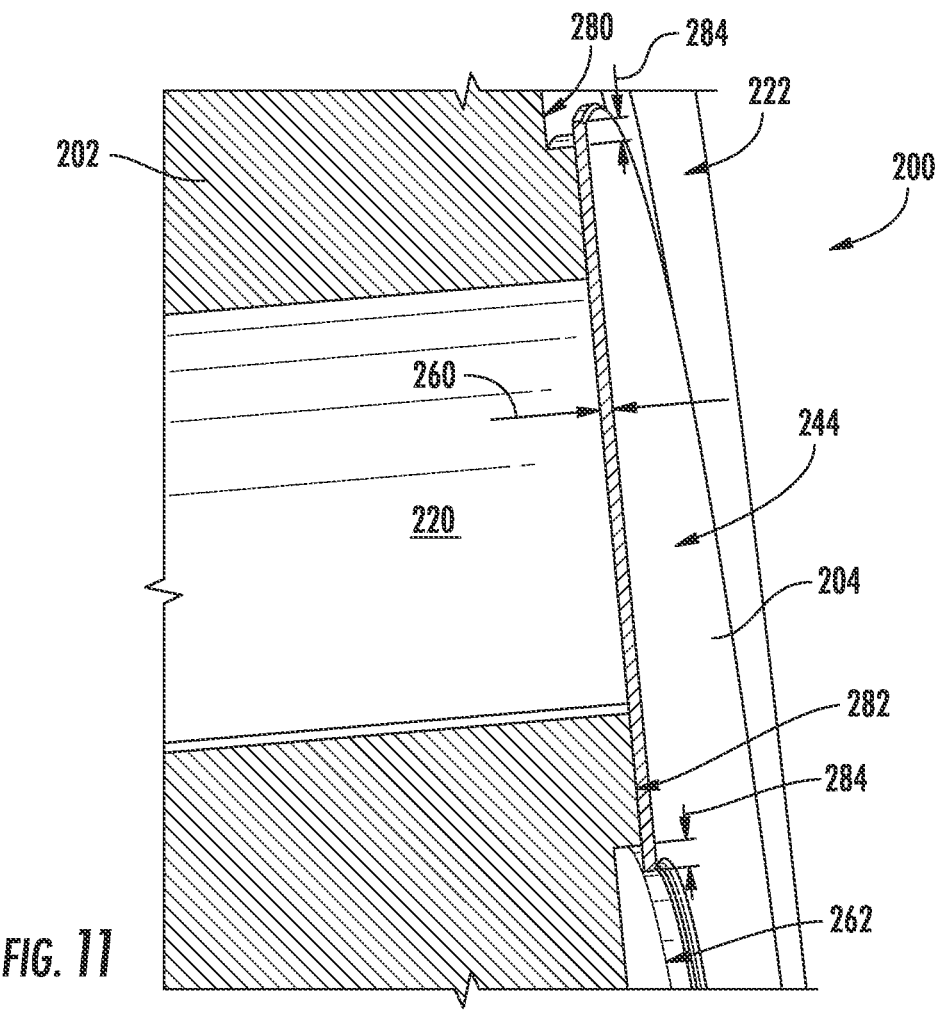

VALVE ASSEMBLY FOR A RECIPROCATING COMPRESSOR

FIELD OF THE INVENTION

The present subject matter relates generally to reciprocating compressors, and more particularly, to valves for use in reciprocating compressors.

BACKGROUND OF THE INVENTION

Certain refrigerator appliances include sealed systems for cooling chilled chambers of the refrigerator appliance. The sealed systems generally include a compressor that generates compressed refrigerant during operation of the sealed system. The compressed refrigerant flows to an evaporator where heat exchange between the chilled chambers and the refrigerant cools the chilled chambers and food items located therein. Recently, certain refrigerator appliances have included reciprocating compressors, such as linear compressors, for compressing refrigerant. Linear compressors generally include a piston and a driving coil. The driving coil generates a force for sliding the piston forward and backward within a chamber. During motion of the piston within the chamber, the piston compresses refrigerant.

Reciprocating compressors typically include a one-way valve that permits a flow of gas into a compression chamber as the piston moves into a retracted position during an intake stroke and prevents the gas from escaping the compression chamber as the piston moves into an extended position during a compression stroke. For example, the valve may include a flapper valve mounted to a compression face of the piston. The flapper valve may be thin enough to bend under the force of gas pressure from an intake conduit. Notably, the constant bending of the flapper valve commonly results in extreme bending and fatigue stress that can result in premature degradation and failure of the flapper valve.

Accordingly, a reciprocating compressor with features for improved gas intake and performance would be desirable. More particularly, a reciprocating compressor with an improved valve design would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a reciprocating compressor defining an axial direction and a radial direction is provided. The reciprocating compressor includes a cylindrical casing defining a compression chamber, a piston positioned within the compression chamber and being movable along the axial direction, the piston defining a suction port for receiving a flow of gas, and a valve positioned over the suction port for selectively permitting the flow of gas through the suction port and into the compression chamber. The valve includes a sealing portion positioned over the suction port, an attachment portion mechanically coupled to a compression face of the piston, a support portion that extends away from the attachment portion along the radial direction such that the attachment portion is positioned between the sealing portion and the support portion, wherein the support portion defines a flattened end opposite the sealing portion along the radial direction such that the valve has a non-circular shape, and a connecting portion that mechanically couples the support portion to the sealing portion and permits the sealing portion to move between an open position and a closed position.

In another exemplary embodiment, a valve positioned over a suction port of a piston to selectively permit a flow of gas into a compression chamber is provided. The valve includes a sealing portion positioned over the suction port, an attachment portion mechanically coupled to a compression face of the piston, a support portion that extends away from the attachment portion along a radial direction such that the attachment portion is positioned between the sealing portion and the support portion, wherein the support portion defines a flattened end opposite the sealing portion along the radial direction such that the valve has a non-circular shape, and a connecting portion that mechanically couples the support portion to the sealing portion and permits the sealing portion to move between an open position and a closed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 10 provides a cross sectional view of the exemplary piston and valve of FIG. 8 according to an exemplary embodiment of the present subject matter.

FIG. 11 provides a cross sectional view of a valve seat of the exemplary piston and valve of FIG. 8 according to an exemplary embodiment of the present subject matter.

Figure 1:
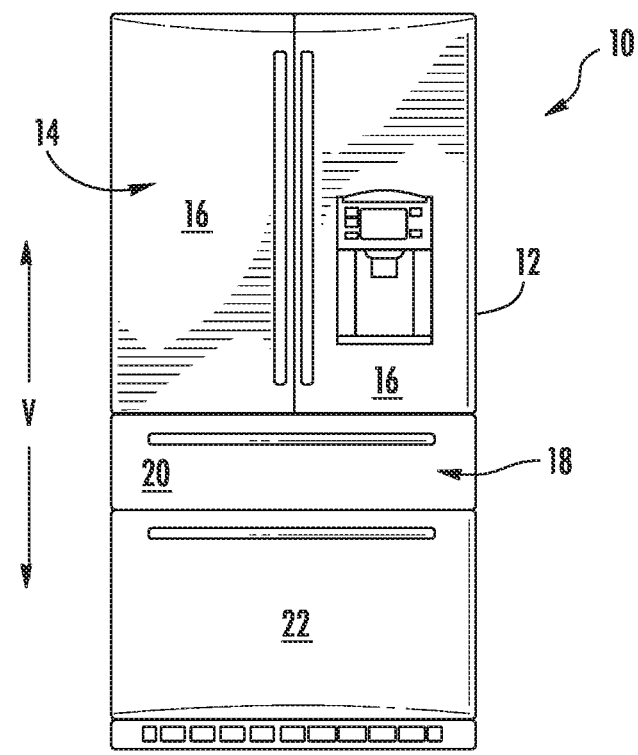
FIG. 1 is a front elevation view of a refrigerator appliance according to an example embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
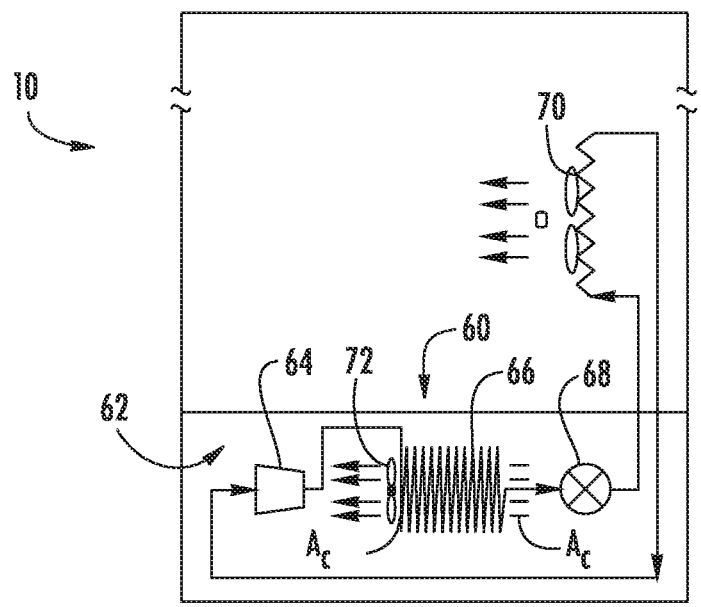
FIG. 2 is schematic view of certain components of the example refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated example embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device 68 (e.g., a valve, capillary tube, or other restriction device) receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well. Furthermore, it should be appreciated that terms such as "refrigerant," "gas," "fluid," and the like are generally intended to refer to a motive fluid for facilitating the operation of refrigeration system 60, and may include, fluid, liquid, gas, or any combination thereof in any state.

Figure 3:
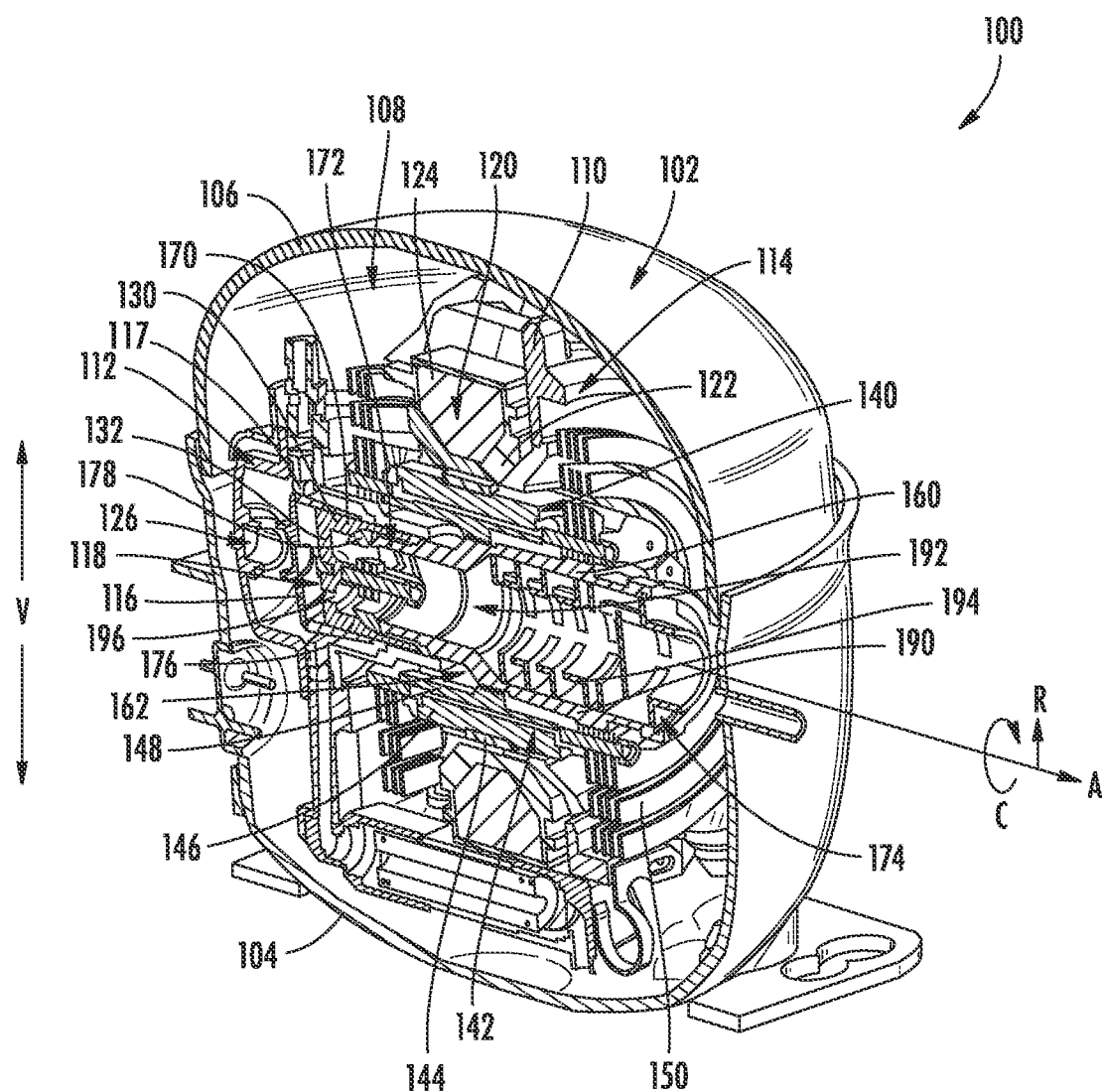
FIG. 3 is a perspective, section view of a linear compressor according to an exemplary embodiment of the present subject matter.
Figure 4:
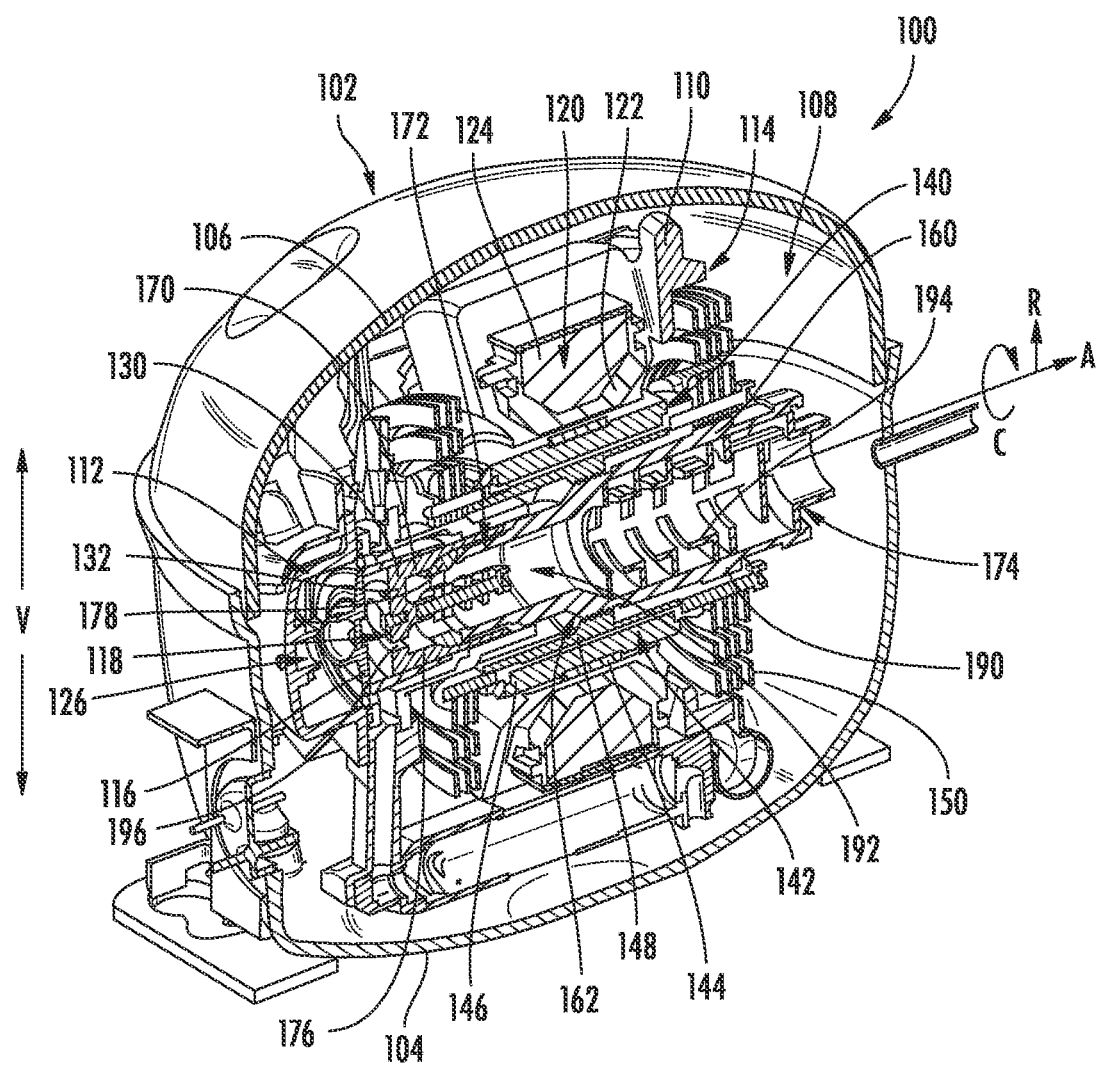
FIG. 4 is another perspective, section view of the exemplary linear compressor of FIG. 3 according to an exemplary embodiment of the present subject matter.
Figure 5:
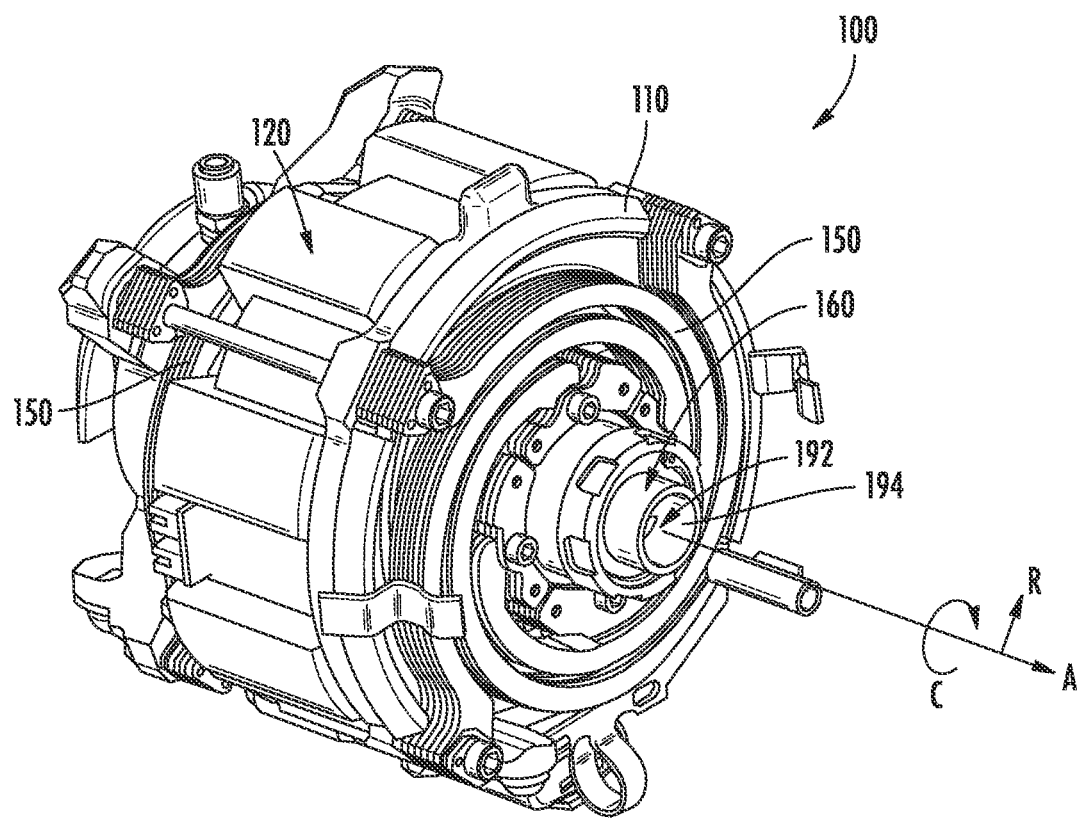
FIG. 5 is a perspective view of a linear compressor with a compressor housing removed for clarity according to an example embodiment of the present subject matter.
Figure 6:
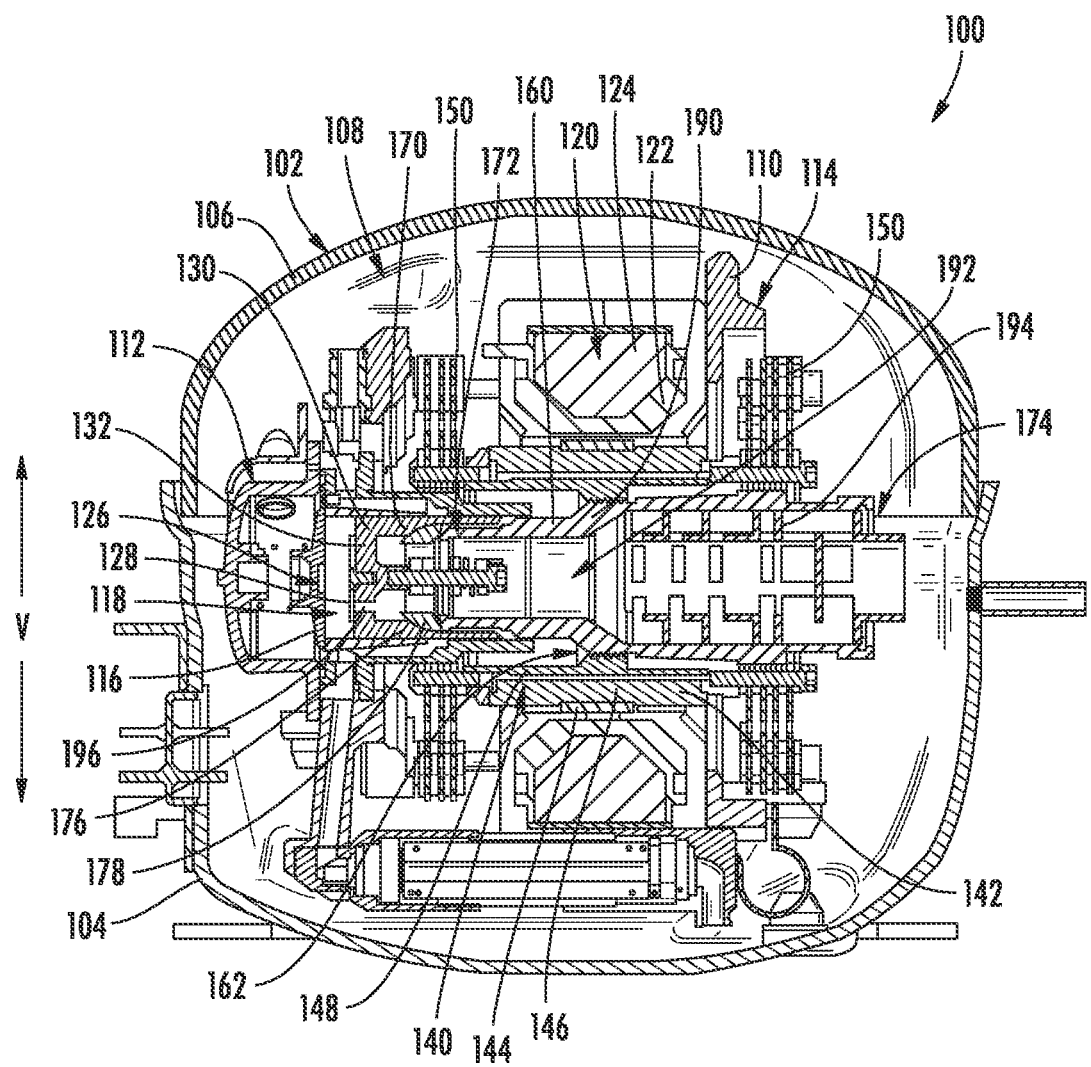
FIG. 6 is a section view of the exemplary linear compressor of FIG. 3 with a piston in an extended position according to an exemplary embodiment of the present subject matter.
Figure 7:
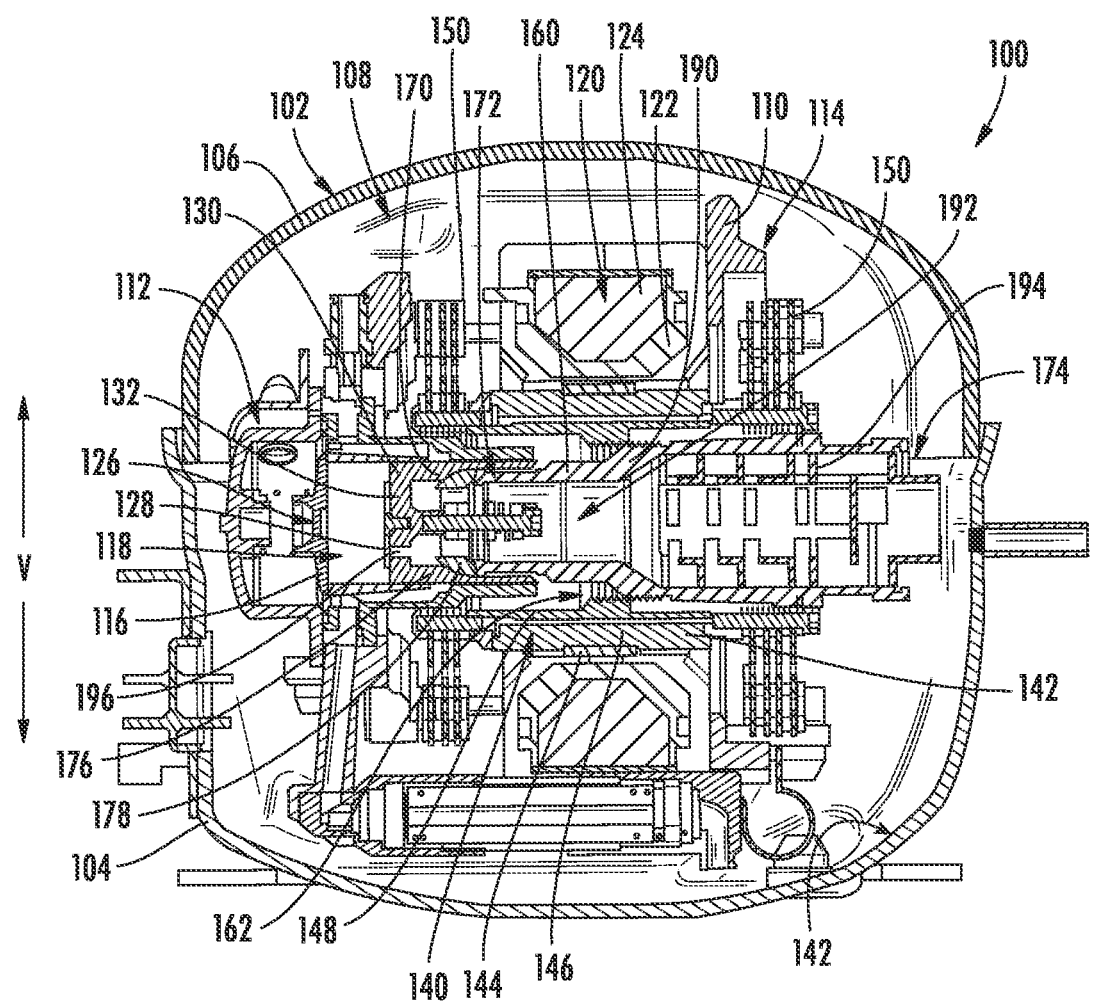
FIG. 7 is a section view of the exemplary linear compressor of FIG. 3 with the piston in a retracted position according to an exemplary embodiment of the present subject matter.

Referring now generally to FIGS. 3 through 7, a linear compressor 100 will be described according to exemplary embodiments of the present subject matter. Specifically, FIGS. 3 and 4 provide perspective, section views of linear compressor 100, FIG. 5 provides a perspective view of linear compressor 100 with a compressor shell or housing 102 removed for clarity, and FIGS. 6 and 7 provide section views of linear compressor when a piston is in an extended and retracted position, respectively. It should be appreciated that linear compressor 100 is used herein only as an exemplary embodiment to facilitate the description of aspects of the present subject matter. Modifications and variations may be made to linear compressor 100 while remaining within the scope of the present subject matter. Indeed, aspects of the present subject matter are applicable to any suitable piston-actuated or reciprocating compressor.

As illustrated for example in FIGS. 3 and 4, housing 102 may include a lower portion or lower housing 104 and an upper portion or upper housing 106 which are joined together to form a substantially enclosed cavity 108 for housing various components of linear compressor 100. Specifically, for example, cavity 108 may be a hermetic or air-tight shell that can house working components of linear compressor 100 and may hinder or prevent refrigerant from leaking or escaping from refrigeration system 60. In addition, linear compressor 100 generally defines an axial direction A, a radial direction R, and a circumferential direction C. It should be appreciated that linear compressor 100 is described and illustrated herein only to describe aspects of the present subject matter. Variations and modifications to linear compressor 100 may be made while remaining within the scope of the present subject matter.

Referring now generally to FIGS. 3 through 7, various parts and working components of linear compressor 100 will be described according to an exemplary embodiment. As shown, linear compressor 100 includes a casing 110 that extends between a first end portion 112 and a second end portion 114, e.g., along the axial direction A. Casing 110 includes a cylinder 117 that defines a chamber 118. Cylinder 117 is positioned at or adjacent first end portion 112 of casing 110. Chamber 118 extends longitudinally along the axial direction A. As discussed in greater detail below, linear compressor 100 is operable to increase a pressure of fluid within chamber 118 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2).

Linear compressor 100 includes a stator 120 of a motor that is mounted or secured to casing 110. For example, stator 120 generally includes an outer back iron 122 and a driving coil 124 that extend about the circumferential direction C within casing 110. Linear compressor 100 also includes one or more valves that permit refrigerant to enter and exit chamber 118 during operation of linear compressor 100. For example, a discharge muffler 126 is positioned at an end of chamber 118 for regulating the flow of refrigerant out of chamber 118, while a suction valve 128 (shown only in FIGS. 6-7 for clarity) regulates flow of refrigerant into chamber 118.

A piston 130 with a piston head 132 is slidably received within chamber 118 of cylinder 117. In particular, piston 130 is slidable along the axial direction A. During sliding of piston head 132 within chamber 118, piston head 132 compresses refrigerant within chamber 118. As an example, from a top dead center position (see, e.g., FIG. 6), piston head 132 can slide within chamber 118 towards a bottom dead center position (see, e.g., FIG. 7) along the axial direction A, i.e., an expansion stroke of piston head 132. When piston head 132 reaches the bottom dead center position, piston head 132 changes directions and slides in chamber 118 back towards the top dead center position, i.e., a compression stroke of piston head 132. It should be understood that linear compressor 100 may include an additional piston head and/or additional chambers at an opposite end of linear compressor 100. Thus, linear compressor 100 may have multiple piston heads in alternative exemplary embodiments.

As illustrated, linear compressor 100 also includes a mover 140 which is generally driven by stator 120 for compressing refrigerant. Specifically, for example, mover 140 may include an inner back iron 142 positioned in stator 120 of the motor. In particular, outer back iron 122 and/or driving coil 124 may extend about inner back iron 142, e.g., along the circumferential direction C. Inner back iron 142 also has an outer surface that faces towards outer back iron 122 and/or driving coil 124. At least one driving magnet 144 is mounted to inner back iron 142, e.g., at the outer surface of inner back iron 142.

Driving magnet 144 may face and/or be exposed to driving coil 124. In particular, driving magnet 144 may be spaced apart from driving coil 124, e.g., along the radial direction R by an air gap. Thus, the air gap may be defined between opposing surfaces of driving magnet 144 and driving coil 124. Driving magnet 144 may also be mounted or fixed to inner back iron 142 such that an outer surface of driving magnet 144 is substantially flush with the outer surface of inner back iron 142. Thus, driving magnet 144 may be inset within inner back iron 142. In such a manner, the magnetic field from driving coil 124 may have to pass through only a single air gap between outer back iron 122 and inner back iron 142 during operation of linear compressor 100, and linear compressor 100 may be more efficient relative to linear compressors with air gaps on both sides of a driving magnet.

As may be seen in FIG. 3, driving coil 124 extends about inner back iron 142, e.g., along the circumferential direction C. In alternative example embodiments, inner back iron 142 may extend around driving coil 124 along the circumferential direction C. Driving coil 124 is operable to move the inner back iron 142 along the axial direction A during operation of driving coil 124. As an example, a current may be induced within driving coil 124 by a current source (not shown) to generate a magnetic field that engages driving magnet 144 and urges piston 130 to move along the axial direction A in order to compress refrigerant within chamber 118 as described above and will be understood by those skilled in the art. In particular, the magnetic field of driving coil 124 may engage driving magnet 144 in order to move inner back iron 142 and piston head 132 along the axial direction A during operation of driving coil 124. Thus, driving coil 124 may slide piston 130 between the top dead center position and the bottom dead center position, e.g., by moving inner back iron 142 along the axial direction A, during operation of driving coil 124.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 124 of the motor. Thus, the controller may selectively activate driving coil 124, e.g., by inducing current in driving coil 124, in order to compress refrigerant with piston 130 as described above.

The controller includes memory and one or more processing devices such as microprocessors, CPUs or the like, such as general or special purpose microprocessors operable to execute programming instructions or micro-control code associated with operation of linear compressor 100. The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Inner back iron 142 further includes an outer cylinder 146 and an inner sleeve 148. Outer cylinder 146 defines the outer surface of inner back iron 142 and also has an inner surface positioned opposite the outer surface of outer cylinder 146. Inner sleeve 148 is positioned on or at inner surface of outer cylinder 146. A first interference fit between outer cylinder 146 and inner sleeve 148 may couple or secure outer cylinder 146 and inner sleeve 148 together. In alternative exemplary embodiments, inner sleeve 148 may be welded, glued, fastened, or connected via any other suitable mechanism or method to outer cylinder 146.

Outer cylinder 146 may be constructed of or with any suitable material. For example, outer cylinder 146 may be constructed of or with a plurality of (e.g., ferromagnetic) laminations. The laminations are distributed along the circumferential direction C in order to form outer cylinder 146 and are mounted to one another or secured together, e.g., with rings pressed onto ends of the laminations. Outer cylinder 146 may define a recess that extends inwardly from the outer surface of outer cylinder 146, e.g., along the radial direction R. Driving magnet 144 is positioned in the recess on outer cylinder 146, e.g., such that driving magnet 144 is inset within outer cylinder 146.

Linear compressor 100 also includes a pair of planar springs 150. Each planar spring 150 may be coupled to a respective end of inner back iron 142, e.g., along the axial direction A. During operation of driving coil 124, planar springs 150 support inner back iron 142. In particular, inner back iron 142 is suspended by planar springs 150 within the stator or the motor of linear compressor 100 such that motion of inner back iron 142 along the radial direction R is hindered or limited while motion along the axial direction A is relatively unimpeded. Thus, planar springs 150 may be substantially stiffer along the radial direction R than along the axial direction A. In such a manner, planar springs 150 can assist with maintaining a uniformity of the air gap between driving magnet 144 and driving coil 124, e.g., along the radial direction R, during operation of the motor and movement of inner back iron 142 on the axial direction A. Planar springs 150 can also assist with hindering side pull forces of the motor from transmitting to piston 130 and being reacted in cylinder 117 as a friction loss.

A flex mount 160 is mounted to and extends through inner back iron 142. In particular, flex mount 160 is mounted to inner back iron 142 via inner sleeve 148. Thus, flex mount 160 may be coupled (e.g., threaded) to inner sleeve 148 at the middle portion of inner sleeve 148 and/or flex mount 160 in order to mount or fix flex mount 160 to inner sleeve 148. Flex mount 160 may assist with forming a coupling 162. Coupling 162 connects inner back iron 142 and piston 130 such that motion of inner back iron 142, e.g., along the axial direction A, is transferred to piston 130.

Coupling 162 may be a compliant coupling that is compliant or flexible along the radial direction R. In particular, coupling 162 may be sufficiently compliant along the radial direction R such that little or no motion of inner back iron 142 along the radial direction R is transferred to piston 130 by coupling 162. In such a manner, side pull forces of the motor are decoupled from piston 130 and/or cylinder 117 and friction between piston 130 and cylinder 117 may be reduced.

As may be seen in the figures, piston head 132 of piston 130 has a piston cylindrical side wall 170. Cylindrical side wall 170 may extend along the axial direction A from piston head 132 towards inner back iron 142. An outer surface of cylindrical side wall 170 may slide on cylinder 117 at chamber 118 and an inner surface of cylindrical side wall 170 may be positioned opposite the outer surface of cylindrical side wall 170. Thus, the outer surface of cylindrical side wall 170 may face away from a center of cylindrical side wall 170 along the radial direction R, and the inner surface of cylindrical side wall 170 may face towards the center of cylindrical side wall 170 along the radial direction R.

Flex mount 160 extends between a first end portion 172 and a second end portion 174, e.g., along the axial direction A. According to an exemplary embodiment, the inner surface of cylindrical side wall 170 defines a ball seat 176 proximate first end portion. In addition, coupling 162 also includes a ball nose 178. Specifically, for example, ball nose 178 is positioned at first end portion 172 of flex mount 160, and ball nose 178 may contact flex mount 160 at first end portion 172 of flex mount 160. In addition, ball nose 178 may contact piston 130 at ball seat 176 of piston 130. In particular, ball nose 178 may rest on ball seat 176 of piston 130 such that ball nose 178 is slidable and/or rotatable on ball seat 176 of piston 130. For example, ball nose 178 may have a frusto-spherical surface positioned against ball seat 176 of piston 130, and ball seat 176 may be shaped complementary to the frusto-spherical surface of ball nose 178. The frusto-spherical surface of ball nose 178 may slide and/or rotate on ball seat 176 of piston 130.

Relative motion between flex mount 160 and piston 130 at the interface between ball nose 178 and ball seat 176 of piston 130 may provide reduced friction between piston 130 and cylinder 117, e.g., compared to a fixed connection between flex mount 160 and piston 130. For example, when an axis on which piston 130 slides within cylinder 117 is angled relative to the axis on which inner back iron 142 reciprocates, the frusto-spherical surface of ball nose 178 may slide on ball seat 176 of piston 130 to reduce friction between piston 130 and cylinder 117 relative to a rigid connection between inner back iron 142 and piston 130.

Flex mount 160 is connected to inner back iron 142 away from first end portion 172 of flex mount 160. For example, flex mount 160 may be connected to inner back iron 142 at second end portion 174 of flex mount 160 or between first and second end portions 172, 174 of flex mount 160. Conversely, flex mount 160 is positioned at or within piston 130 at first end portion 172 of flex mount 160, as discussed in greater detail below.

In addition, flex mount 160 includes a tubular wall 190 between inner back iron 142 and piston 130. A channel 192 within tubular wall 190 is configured for directing compressible fluid, such as refrigerant or air, though flex mount 160 towards piston head 132 and/or into piston 130. Inner back iron 142 may be mounted to flex mount 160 such that inner back iron 142 extends around tubular wall 190, e.g., at the middle portion of flex mount 160 between first and second end portions 172, 174 of flex mount 160. Channel 192 may extend between first and second end portions 172, 174 of flex mount 160 within tubular wall 190 such that the compressible fluid is flowable from first end portion 172 of flex mount 160 to second end portion 174 of flex mount 160 through channel 192. In such a manner, compressible fluid may flow through inner back iron 142 within flex mount 160 during operation of linear compressor 100. A muffler 194 may be positioned within channel 192 within tubular wall 190, e.g., to reduce the noise of compressible fluid flowing through channel 192.

Piston head 132 also defines at least one opening 196. Opening 196 of piston head 132 extends, e.g., along the axial direction A, through piston head 132. Thus, the flow of fluid may pass through piston head 132 via opening 196 of piston head 132 into chamber 118 during operation of linear compressor 100. In such a manner, the flow of fluid (that is compressed by piston head 132 within chamber 118) may flow within channel 192 through flex mount 160 and inner back iron 142 to piston 130 during operation of linear compressor 100. As explained above, suction valve 128 (FIGS. 6-7) may be positioned on piston head 132 to regulate the flow of compressible fluid through opening 196 into chamber 118.

Referring now to FIGS. 8 through 12, an exemplary piston head assembly 200 for use with a reciprocating compressor will be described according to exemplary embodiments of the present subject matter. For example, according to an exemplary embodiment, piston head assembly 200 may be used within linear compressor 100. In this regard, for example, piston head assembly 200 may be used in place of suction valve 128, piston 130, and/or piston head 132, and may be positioned within cylinder 117 for compressing refrigerant within refrigeration system 60. However, it should be appreciated that piston head assembly 200 is not limited to use within linear compressor 100, but may instead be used in any other suitable application where a piston is used to compress a fluid, gas, refrigerant, etc. Such applications are contemplated as being within the scope of the present subject matter.

In general, piston head assembly 200 includes a piston 202 that is generally configured for compressing a gas and a valve 204 that is used for selectively permitting a flow of the gas into a chamber for subsequent compression. Specifically, as illustrated schematically in FIG. 8, a cylindrical casing 206 may define a compression chamber 208 within which gas (e.g., identified generally by reference numeral 210) may be compressed. For example, continuing the example from above, cylindrical casing 206 may be the same or similar to cylinder 117 and compression chamber 208 may be the same or similar to chamber 118. In addition, a discharge valve 212 (e.g., similar to discharge valve 116) may be positioned at the end of cylindrical casing 206 for selectively discharging compressed refrigerant gas 210. As illustrated, piston head assembly 200 generally defines an axial direction A and a radial direction R, e.g., which correspond for example to the same directions as for linear compressor 100.

Figure 8:
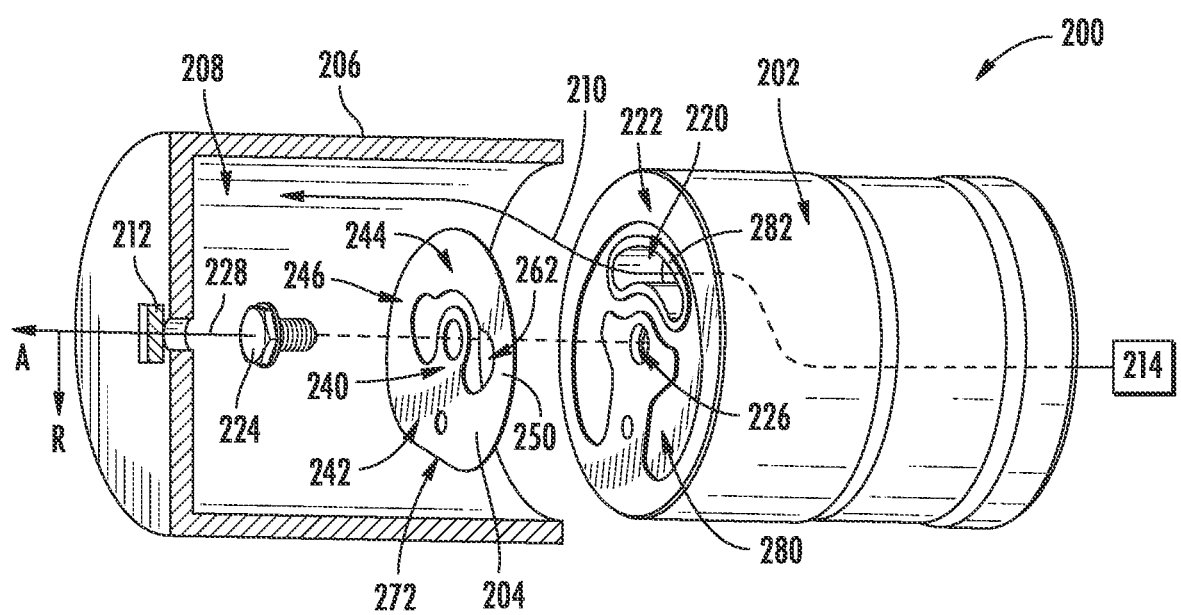
FIG. 8 provides an exploded perspective view of a piston and valve that may be used with the exemplary linear compressor of FIG. 3 according to an exemplary embodiment of the present subject matter.
Figure 9:
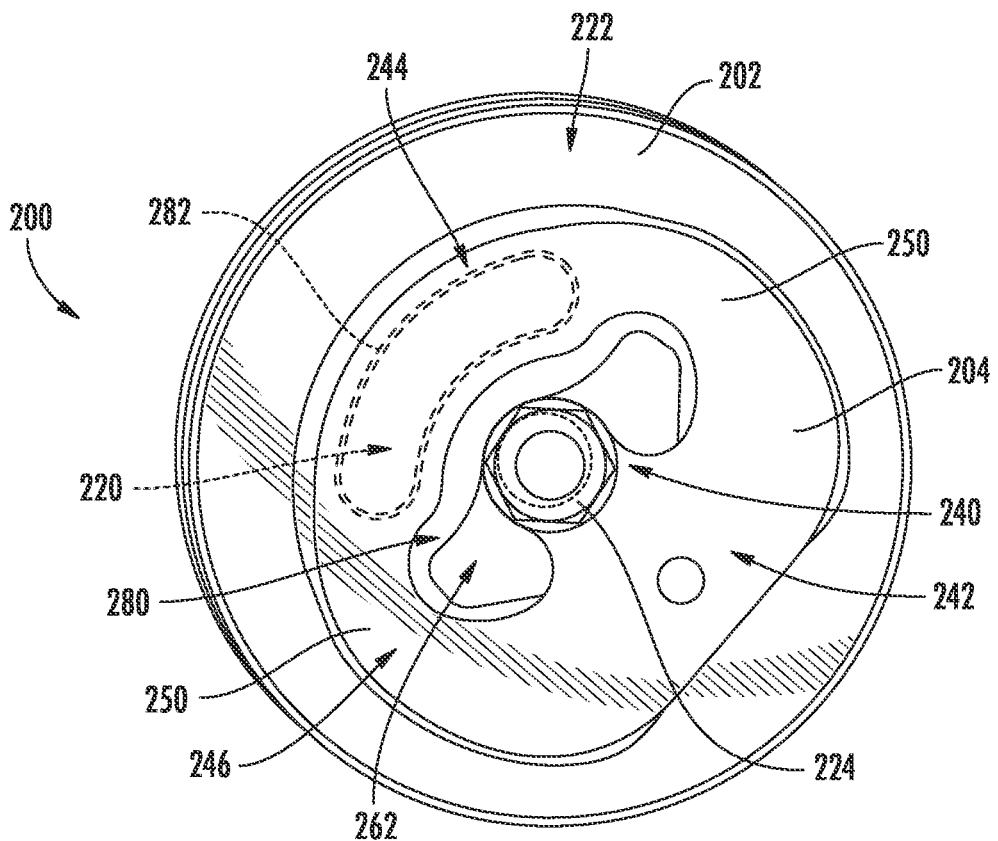
FIG. 9 is a top view of a compression face of the exemplary piston and valve of FIG. 8 according to an exemplary embodiment of the present subject matter.

Referring still to FIG. 8, piston head assembly 200 may be generally configured for drawing a flow of gas 210 from a gas supply 214 into compression chamber 208 through a suction port 220 which is defined within a compression face 222 of piston 202. Piston 202 may define an internal chamber fluidly coupled to gas supply 214. In operation, as piston 202 moves toward a retracted position along the axial direction A, negative pressure within compression chamber 208 draws the flow of gas 210 through the internal chamber and suction port 220 into compression chamber 208. After the compression chamber 208 is charged with gas 210, piston 202 may be moved to an extended position along the axial direction A such that compression face 222 compresses gas 210 within compression chamber 208, which may be discharged through discharge valve 212.

Valve 204 is generally configured for permitting gas 210 to flow into compression chamber 208 during an intake stroke while preventing gas 210 from exiting compression chamber 208 during a compression stroke. As shown, valve 204 may be secured to compression face 222 of piston 202 using a mechanical fastener 224. Specifically, according to the illustrated embodiment, mechanical fastener 224 is received within a boss 226 defined on a central axis 228 of piston 202. In other words, mechanical faster 224 is positioned at a center of piston 202 along the radial direction R. Although valve 204 is described herein is being joined to piston 202 with a mechanical fastener 224, it should be appreciated that any other suitable method of joining valve 204 and piston 202 may be used while remaining within the scope of the present subject matter. Aspects of the present subject matter are directed to an improved valve 204 which will be described in detail below.

Referring now generally to FIGS. 8 through 12, valve 204 includes an attachment portion 240 that defines an aperture through which mechanical fastener 224 passes to secure valve 204 to piston 202. In general, attachment portion 240 is a small, substantially circular island positioned within a center of valve 204. When valve 204 is attached to piston 202, attachment portion 240 is firmly seated against compression face 222. In addition, valve 204 includes a support portion 242 that extends away from attachment portion 240 along the radial direction R. More specifically, support portion 242 is positioned opposite of suction port 220 relative to central axis 228 or attachment portion 240. Valve 204 further includes a sealing portion 244 that is positioned over suction port 220 when valve 204 is attached to piston 202. As shown, attachment portion 240 is positioned between sealing portion 244 and support portion 242 along the radial direction R.

As shown in the figures, valve 204 further includes a connecting portion 246 that mechanically couples support portion 242 to sealing portion 244 and permits sealing portion 244 to move between an open position and a closed position. Specifically, according to the illustrated embodiment, connecting portion 246 includes two connecting arms 250 that extend between support portion 242 and sealing portion 244. Specifically, as illustrated, connecting arms 250 generally are arcuate and follow a contour of the perimeter of compression face 222 such that sealing portion 244 is cantilevered relative to attachment portion 240 and support portion 242. Thus, during an intake stroke, sealing portion 244 may lift off suction port 220, e.g., by bending or flexing connecting portion 246 (i.e., connecting arms 250). Notably, connecting arms 250 may be resilient such that at the bottom of the intake stroke, sealing portion 244 may again be seated against suction port 220.

Notably, piston 202 and valve 204 have unique geometries and configurations that facilitate improved operation of piston head assembly 200 and prolonged life of the valve 204. In this regard, the geometries and configurations described herein reduce bending and fatigue stress on valve 204. Although exemplary geometries will be described, it should be appreciated that these geometries may vary while remaining within the scope of the present subject matter.

According to the illustrated embodiment, valve 204 defines a valve thickness 260 that is measured along the axial direction A or along central axis 228. According to exemplary embodiments, valve 204 may be formed from a single piece of sheet material (e.g., such as thin sheet metal). As such, valve thickness 260 may be constant over the entire valve 204 (i.e., all portions 240-246 have the same thickness). According to the illustrated embodiment, suction port 220 is positioned away from or offset relative to central axis 228 of piston 202 along the radial direction R. In addition, suction port 220 is arcuate or kidney-shaped, e.g., such that it curves partially around central axis 228. Specifically, according to the illustrated embodiment, suction port 220 extends about an arc length of between about 30° and 150°, between about 60° and 120°, or about 90°. Notably, according to the illustrated embodiment, sealing portion 244 may be similarly arcuate or kidney-shaped.

In order to permit flexing of connecting portion 246 and to move sealing portion 244 to the open position, valve 204 defines a void 262 between attachment portion 240 and sealing portion 244. In general, void 262 may also be kidney-shaped and may wrap or curve around attachment portion 240. In addition, connecting arms 250 may have a variable thickness or nonuniform cross-section. In this regard, for example, connecting arms 250 may be wider proximate support portion 242 and may be thinner toward sealing portion 244. According to exemplary embodiments, the variation in the cross-sectional width from the thickest portion to the thinnest portion may define a width ratio of greater than 2 to 1, greater than 3 to 1, greater than 4:1, or greater. As such, void 262 may generally be kidney-shaped with enlarged bulbs at each end.

Figure 12:
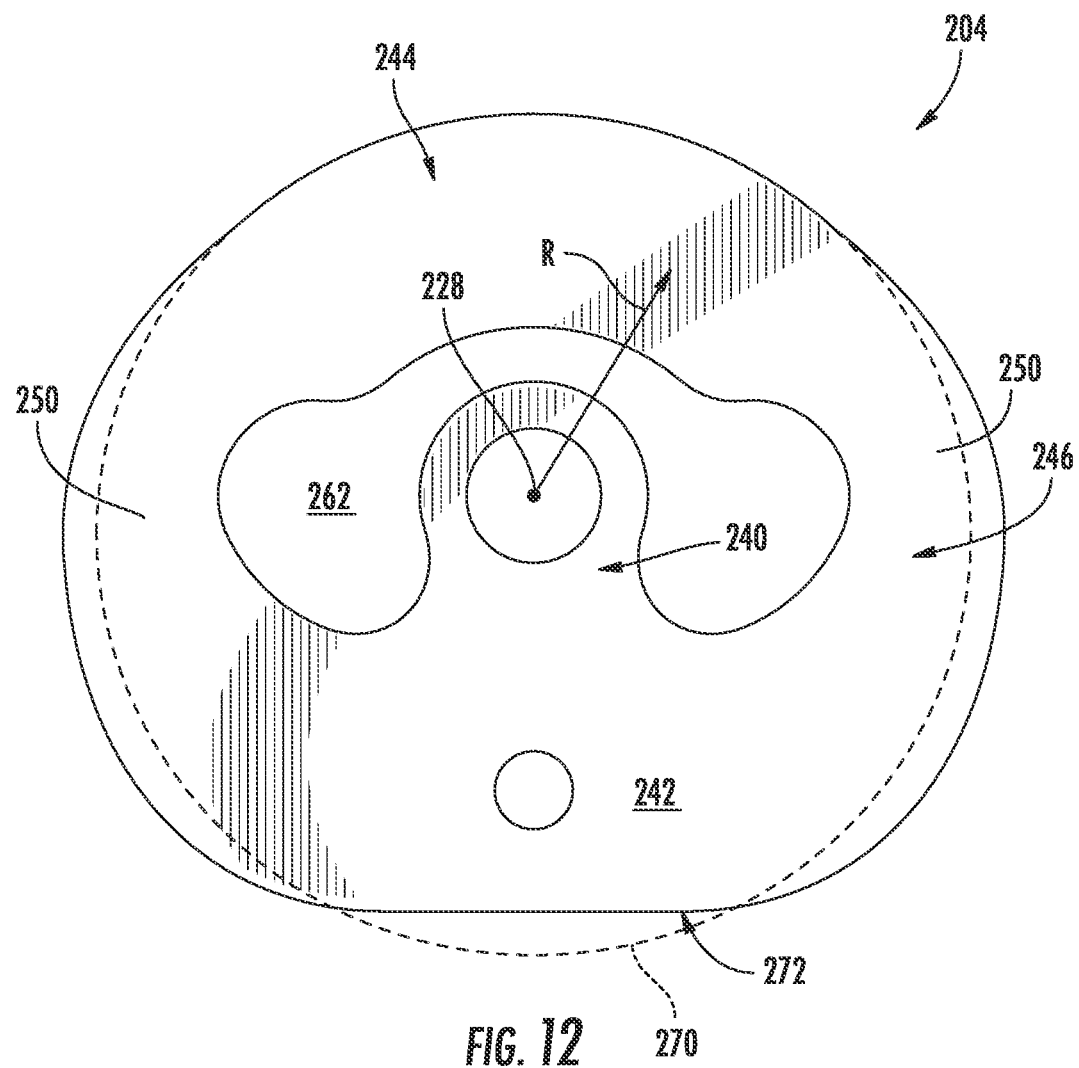
FIG. 12 provides a schematic view of the exemplary valve of FIG. 8 position over a reference circle according to an exemplary embodiment of the present subject matter.

As best shown in FIG. 12, valve 204 may also have a non-circular shape, e.g., within a radial plane. In this regard, FIG. 12 illustrates a reference circle 270 (dotted lines) that has a fixed radius to illustrate the non-circularity of valve 204. As shown, support portion 242 defines a flattened end 272 that is positioned opposite sealing portion 244 along the radial direction R. Flattened end 272 may be straight and may extend along an arc length of valve 204. Specifically, according to the illustrated embodiment, flattened end 272 extends about an arc length of between about 10° and 110°, between about 30° and 90°, between about 45° and 75°, or about 60°. Notably, flattened end 272 may provide for higher stiffness and distributed loading in attachment portion 240, support portion 242, and/or connecting portion 246, e.g., in order to minimize stresses on an inner radius of valve 204. For example, this allows the distal part of connecting arms 250 (e.g., proximate sealing portion 244) to be more flexible, while maintaining a uniform inner edge stress during opening of valve 204.

Referring now specifically to FIGS. 8 and 10-11, piston 202 may further define a recessed portion 280 that is defined within compression face 222. A valve seat 282 may be raised relative to recessed portion 280 and sealing portion 244 may be configured to create a fluid seal against valve seat 282 in the closed position. Notably, recessed portion 280 generally provides for a better seal against valve seat 282 as valve 204 moves toward the closed position. In addition, as illustrated, at least a portion of valve 204 may overlap valve seat 282 and/or a portion of compression face 222. In this regard, for example, a portion of sealed portion 244 hangs over valve seat 282 into and over a recessed portion 280 along the radial direction R. Notably, this overhang may help minimize impact stresses of valve 204. According to exemplary embodiments, valve 204 may overlap valve seat 282 by an average overlap distance 284 measured along the radial direction R. Specifically, according to exemplary embodiments, average overlap distance 284 may be between about 0.05 and 2 mm, between about 0.1 and 1 mm, between about 0.3 and 0.7 mm, or about 0.5 mm.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A reciprocating compressor defining an axial direction and a radial direction, the reciprocating compressor comprising:

a cylindrical casing defining a compression chamber;

a piston positioned within the compression chamber and being movable along the axial direction, the piston defining a suction port for receiving a flow of gas, wherein the piston comprises a compression face, a recessed portion that is defined within the compression face, and a valve seat that is raised relative to the recessed portion; and a valve positioned over the suction port for selectively permitting the flow of gas through the suction port and into the compression chamber, the valve comprising:

a sealing portion that is positioned over the suction port and creating a fluid seal against the valve seat in a closed position, wherein the sealing portion of the valve overlaps the valve seat and hangs into the recessed portion that is defined within the compression face along the radial direction;

an attachment portion mechanically coupled to the compression face of the piston;

a support portion that extends away from the attachment portion along the radial direction such that the attachment portion is positioned between the sealing portion and the support portion, wherein the support portion defines a flattened end opposite the sealing portion along the radial direction such that the valve has a non-circular shape; and a connecting portion that mechanically couples the support portion to the sealing portion and permits the sealing portion to move between an open position and the closed position.

2. The reciprocating compressor of claim 1, wherein the suction port is positioned away from a central axis of the piston along the radial direction.

3. The reciprocating compressor of claim 1, wherein the suction port is kidney-shaped.

4. The reciprocating compressor of claim 1, wherein a void is defined within the valve between the attachment portion and the sealing portion.

5. The reciprocating compressor of claim 4, wherein the void is kidney-shaped and curves around the attachment portion.

6. The reciprocating compressor of claim 1, wherein the connecting portion comprises two connecting arms that extend between the support portion and the sealing portion around a perimeter of the compression face of the piston.

7. The reciprocating compressor of claim 6, wherein each of the two connecting arms have non-uniform cross section.

8. The reciprocating compressor of claim 1, wherein the attachment portion is positioned on a central axis of the piston, and wherein a mechanical fastener passes through the attachment portion to mount the valve to the piston.

9. The reciprocating compressor of claim 1, wherein an average overlap distance of the sealing portion over the valve seat is between 0.1 and 1 millimeters.

10. The reciprocating compressor of claim 1, wherein the valve is a flapper valve, which is having a constant thickness along the axial direction.

11. A valve positioned over a suction port of a piston to selectively permit a flow of gas into a compression chamber, wherein the piston comprises a compression face, a recessed portion that is defined within the compression face, and a valve seat that is raised relative to the recessed portion, the valve comprising:

a sealing portion that is positioned over the suction port and creating a fluid seal against the valve seat in a closed position, wherein the sealing portion of the valve overlaps the valve seat and hangs into the recessed portion that is defined within the compression face along a radial direction;

an attachment portion mechanically coupled to the compression face of the piston;

a support portion that extends away from the attachment portion along the radial direction such that the attachment portion is positioned between the sealing portion and the support portion, wherein the support portion defines a flattened end opposite the sealing portion along the radial direction such that the valve has a non-circular shape; and a connecting portion that mechanically couples the support portion to the sealing portion and permits the sealing portion to move between an open position and the closed position.

12. The valve of claim 11, wherein the suction port is kidney-shaped and is positioned away from a central axis of the piston along the radial direction.

13. The valve of claim 11, wherein a void is defined within the valve between the attachment portion and the sealing portion.

14. The valve of claim 11, wherein the connecting portion comprises two connecting arms that extend between the support portion and the sealing portion around a perimeter of the compression face of the piston.

15. The valve of claim 14, wherein each of the two connecting arms have non-uniform cross section.

16. The valve of claim 11, wherein the valve is a flapper valve, which is having a constant thickness along an axial direction.

* * * * *